May 18, 1965 V. K. PELTOLA 3,184,754
RECORDING OSCILLOGRAPH
Filed Dec. 26, 1962 2 Sheets-Sheet 1

INVENTOR.
Veikko K. Peltola
BY Silverman, Mullin, Coss &
Kaufman
Attorneys

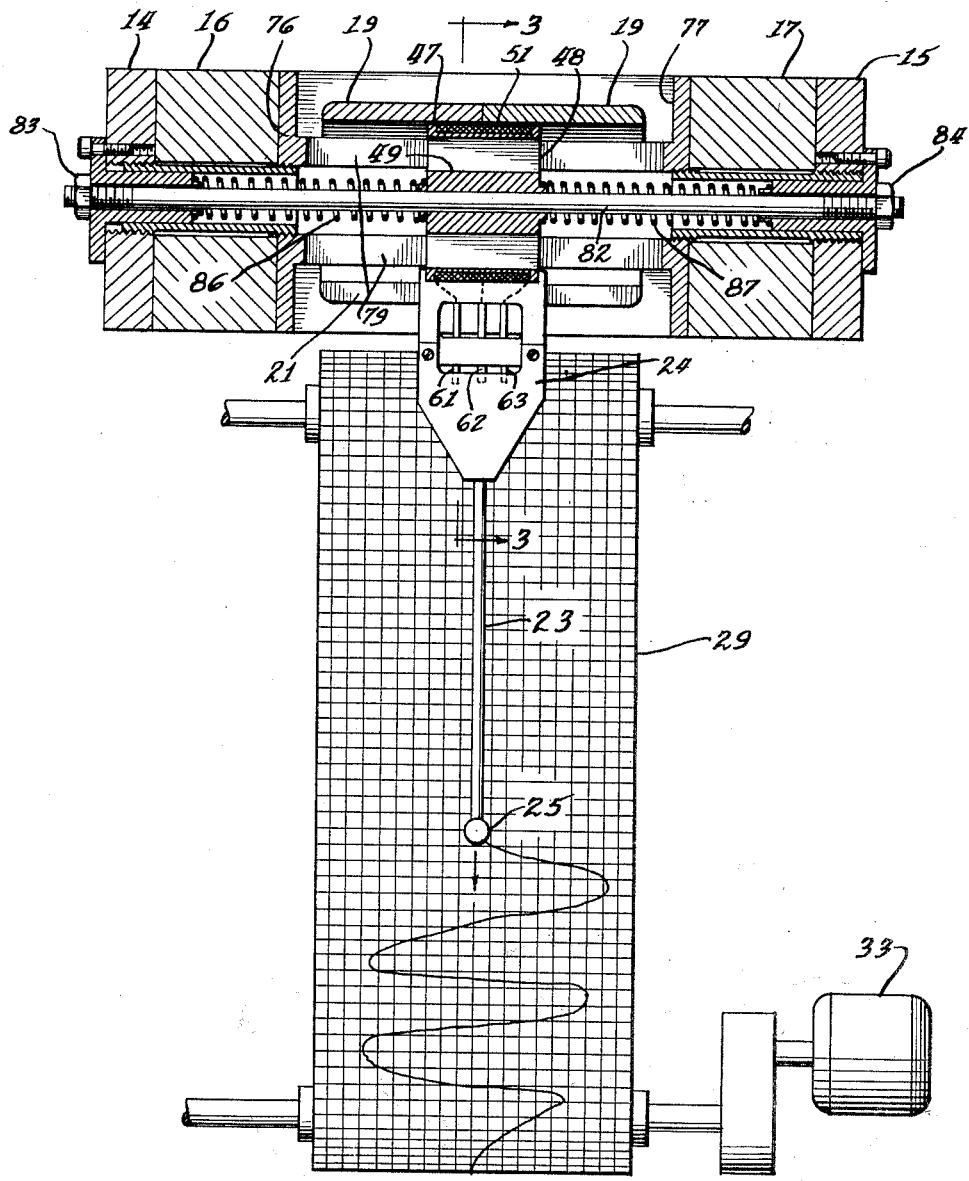

United States Patent Office 3,184,754
Patented May 18, 1965

3,184,754
RECORDING OSCILLOGRAPH
Veikko K. Peltola, Chicago, Ill., assignor to Illinois Testing Laboratories, Inc., Chicago, Ill., a corporation of Illinois
Filed Dec. 26, 1962, Ser. No. 247,022
11 Claims. (Cl. 346—112)

This invention relates generally to apparatus for establishing a visible record of a signal and more particularly, in an important aspect, to apparatus for establishing a visible, rectilinear record of the time variations of an electrical signal.

It has been well known heretofore in the art to establish a time record of variations of an electrical signal indicating meter on an appropriately moving record member. A mechanical linkage associated with such a signal indicating meter has been adapted to move a scribe member over the face of a longitudinally moving record member. Typically, the scribe member has been no more than a pen of one configuration or another, and the record member has been paper which might be driven on a roller in engaging proximity with the scribe member.

The employment of such strategems, in accordance with the prior art, has met with many difficulties. A particularly troublesome difficulty has been that the indicating needle of familiar meters, fundamentally, is a rotary member. Thus, such a needle movement has required relatively complex linkages with the scribe member to establish rectilinear, visible written records of the signal on a record medium, such as paper. Such complex linkages are not only expensive but, by complexity alone prejudice the accuracy of the meter record.

Still further, the employment of the rotary indicating movement of the familiar electrical meter has required compensating adjustments in the connecting linkage for giving an accurate portrayal of the rectilinear characteristics of the signal in question in relationship to another co-ordinate. Normally this other coordinate is time. These linkages, and consequent mechanically introduced correction factors, have accordingly made the record apparatus of the prior art, needlessly complex and overly expensive.

Accordingly, it is an object of the present invention to provide an electrical signal indicating apparatus having a rectilinear indicating movement.

It is a further object of the invention to simplify electrical signal indicating structures.

It is a further object of the invention to provide electrical signal indicating structures which are rugged and durable.

It is a further object of the invention to provide an electrical indicating movement winding disposed about a nonmagnetic coil form which is mounted for movement in a direction perpendicular to the axis of the winding.

It is a further object of the invention to provide a biasing magnetic field passing radially through the coil form.

It is a still further object of the invention to provide connections from an electrical signal to be recorded to the above mentioned winding.

It is a still further object of the invention to provide a drive for moving a record member in a direction substantially perpendicular to the movement of the coil form and the winding disposed thereabout.

It is a still further object of the invention to provide a scribe member mounted for movement with the coil form in operatively engaged relation with the record member.

It is an even further object of the invention to provide spring biasing means for establishing the winding supporting coil form in a neutral position absent a signal being applied to the winding.

Many other objects will become apparent as the following brief description of an illustrative embodiment of the invention proceeds.

The invention will be more clear from a consideration of this brief description of the illustrative embodiment shown in the drawings and from a consideration of the appended claims.

In the drawings:

FIG. 2 is a top plan view, partially in section, of the structure of FIG. 1.

In these drawings, it is seen that the invention, generally, is built around a recording scribe member mounted for movement with a cylindrical, non-magnetic coil form. The winding associated with the coil form is connected to an appropriate source of electrical signals to be recorded.

The coil form is mounted for axial movement between two concentrically arranged, ferromagnetic cylinders. These two cylinders, in turn, serve as magnetic conductors to complete two magnetic loops which are energized by two axially and magnetically opposed permanent magnets. Thus a biasing magnetic field is established radially of the winding. The winding generates a transverse magnetic field in response to signals to be recorded. Accordingly, the coil form, with its associated scribe member, moves longitudinally along the extent of the two concentrically arranged ferromagnetic cylinders.

Figure 1:
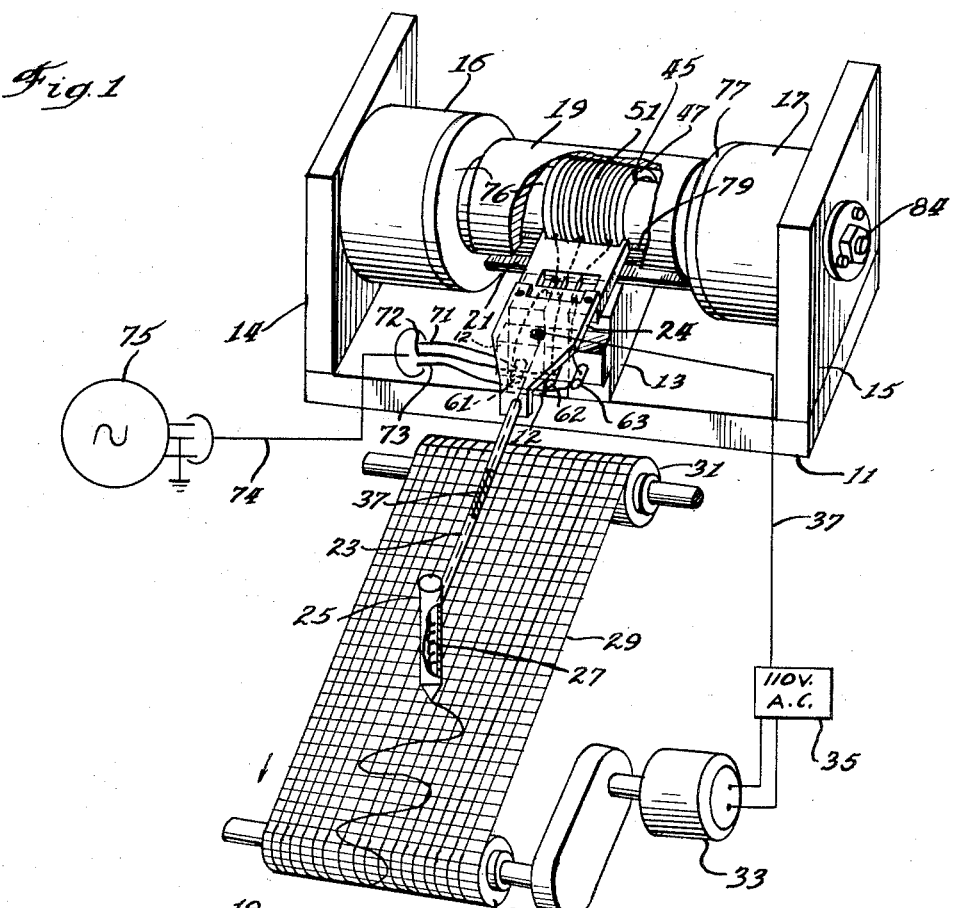
FIG. 1 is a perspective view, partially schematic, showing a signal recording apparatus constructed in accordance with the invention, parts being broken away to show the details thereof, partially in section.

Referring now more particularly to the drawings, in FIG. 1 there is seen a soft iron base plate 11 having juxtaposed vertical mounting portions 12 and 13, horizontally arranged near the center of the base plate. This ferromagnetic foundation plate also has opposite vertical end portions 14 and 15, similarly disposed to provide mounting for two permanent magnets 16 and 17, respectively. These magnets are mounted with opposed magnetic polarity. A cylindrical shell member 19 is mounted on, and connected magnetically to, the central mounting portions 12, 13 of the base plate 11. This shell member is constructed of ferromagnetic material, soft iron, and is spaced apart, as shown, at either end from the magnets 16 and 17, respectively.

The shell member includes a slotted portion 21 extending in a direction corresponding to the axis of the shell member.

A mounting arm 23 having a yoke portion 24, extends interiorly of the shell member 19 through slotted portion 21. This arm provides mounting for a scribe member 25 having an electric heating winding 27 disposed therein. This scribe member is disposed in operative, contacting relation with a record member 29 of thermosensitive paper of a type well known in the art. This record member paper is wound about rollers 31 for motion in a longitudinal direction as indicated by arrows.

This motion is effected by a well known electrical motor 33 under the influence of conventional, 110 volt alternating current from a familiar source 35. This source 35 also supplies a reduced voltage, typically, 6 volts, by way of cable 37 from a transformer (not shown) to the heating winding 27.

By virtue of the heating winding 27, the scribe member establishes a visible record, on the record member 29, of transverse movement imposed on the mounting arm 23.

The mounting arm 23 is connected by a suitable yoke portion 24 to a nonmagnetic, aluminum coil form 45 having a cylindrical outer portion 47 and a pierced central portion 49 connected together by a web 48. These latter three coil form portions are not shown in detail in FIG. 1 for purposes of clarity. These portions are, however, specifically designated in connection with the discussion of FIG. 2.

A coil 51 is wound about the form 45.

It will be seen hereafter in more detail in connection with discussion of FIG. 2, the exterior terminals of this coil and a center tap associated therewith are connected by connectors 61, 62 and 63 affixed to the yoke 24 and flexible leads 71, 72 and 73, to a three-conductor cable 74. Thence, these coil terminals are connected, respectively, to the three terminals of a well known alternating current signal source 75. Soft iron core members 76 and 77 are physically and magnetically connected, respectively, to the magnets 16 and 17. These core members are constructed in a hollow cylindrical configuration and have slotted portions 79 therein for permitting longitudinal movement of the web 48 associated with the coil form 45. Thus the central portion 49 of the coil form is free to move within these soft iron core members as the web 48 moves along the slotted portion 79 of these iron core members 76 and 77.

This motion of the core member is along a shaft member 82, not shown specifically in this drawing, save for one end portion 84 affixed in the vertical end portion 15 of the foundation plate 11. This motion of the form member along the shaft 82 is against two centering springs which are seen in the discussion of FIG. 2. These springs are wound about the shaft 82 and urge the form member by compressive stresses toward a central position corresponding to a mid-position of the scribe member 25 on the record member 29.

Looking at this structure of FIG. 1 in broader aspect, operation becomes more clear. In a normal condition the record member 29 moves toward the viewer of FIG. 1 under tensioned urging of the roller 31 as this roller is driven by the motor 33. The heated scribe member 25, disposed in contact with the thermosensitive record member 29, inscribes a visible record thereon in course of longitudinal movement of this member. Such a pattern is indicated by the illustrative pattern shown in the drawing.

With no signal applied to the winding 51, the centering springs tend to position the form member 45 centrally of the guiding shaft and the foundation member 11. Accordingly, a straight line tends to be inscribed on the record member 29, and this straight line is centrally positioned, on this paper record member. As this record member is transported longitudinally, as indicated, magnets 16 and 17 drive magnetic flux through core members 76 and 77, thence radially to the shell member 19. From the shell member this flux passes by way of the mounting members 12 and 13 to the foundation plate 11, to the plate end portion 14 and 15, and to the magnets 16 and 17, respectively, thus completing a magnetic circuit. This magnetic flux of itself causes no motion of the form member 45.

Now, however, the signal applied from the source 75 by way of lead 74 through flexible leads 71, 72 and 73 to plugs 61, 62 and 63, to the winding 51, gives rise to a variable magnetic flux which is orthogonal to the flux which extends radially across the gap between the core members 76 and 77 and the shell member 19. Accordingly, independence upon the direction of the signal current through the plugs 61, 62 and 63, the coil form is urged to move left or right. As this coil form moves left or right, the arm 23 urges the scribe member 25 to move similarly left or right to impose a visible pattern on the record member 29, as illustrated.

Turning next to FIG. 2, there is seen in more detail a portion of the structural arrangements illustrated and outlined in FIG. 1.

In this FIG. 2 the shaft 82 is shown extending between end portions 83 and 84. Compressed spring members 86 and 87 are shown bearing against an axially pierced, central portion 49 of the coil form 45. A winding 51 is disposed about exterior portions 47 of this coil form. Exterior terminals of this winding are connected to plugs 61 and 63 on the yoke 24. Similarly associated center tap plug 62 is also mounted on this yoke 24. Web 48 physically connects the coil form exterior portion 47 with the central portion 49. This web, as shown, is arranged for movement within slotted portions 79 of magnetic core members 76 and 77 which are respectively affixed to the magnets 16 and 17.

Figure 3:
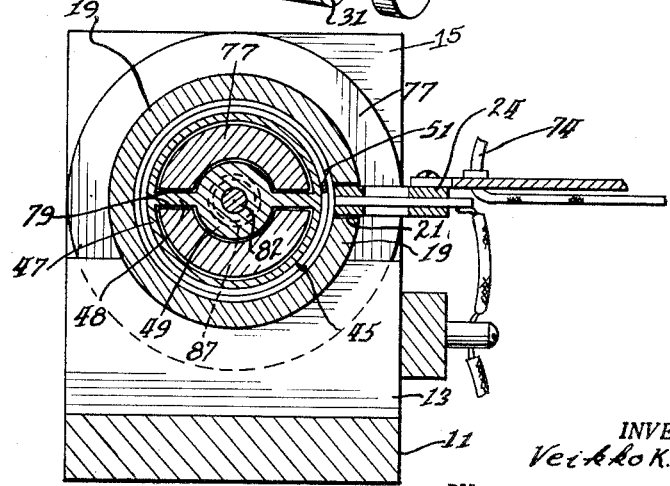
FIG. 3 is a sectional view taken generally along the line 3—3 of FIG. 2 and in the indicated direction.

Turning next to the end view of FIG. 3, the structural relationships of the various magnetic paths in accordance with the invention become more clear. Here guide shaft 82 is shown with spring member 87 disposed thereabout. Core member 77 passes about the central form member portion and is slotted, as shown, to permit free passage of the web 48 in a direction perpendicular to the plane of the drawing of FIG. 3. This slotted portion 79 of the core member 77 permits movement of a web member 48 in a direction perpendicular to the plane of the viewer.

This web member 48 provides a connection between the outer portion 47 of the form member 45 and the central portion of this form. The winding 51 is shown disposed about the aluminum form member 45 for connection to terminal plugs 61, 62 and 63 which are positioned on yoke 24 which is fixedly connected to the coil form 45. The yoke 24 passes through a slotted portion 21 of the ferromagnetic shell member 19 for movement in a plane perpendicular to the drawing of FIG. 3. The illustrated core member 77 is physically and magnetically connected to the magnetic end plate 15 and the shell member 19 is connected magnetically to foundation plate 11 by the mounting portion 13. In this drawing the magnetic gap between shell 19 and core member 77 is clear and the winding 51 and the outer portion 47 of the aluminum coil form 45 also appear.

There has been described heretofore one illustrative embodiment of principles of the invention. Clearly these principles may be applied in varied embodiments without departing from the spirit and scope of the invention which is set forth in the appended claims. One such departure, of course, may well involve the application of a variable magnetic biasing field radially from the core member 77 to shell 19 by means of an appropriate signal energized source. Thus, within the spirit and scope of the invention, this signal might control transverse movements of the scribe member 25 on the record member 29 cooperatively with the signal applied from the source 75.

What is sought to be secured by Letters Patent of the United States is:

1. Apparatus for establishing a record of the variations of an electrical signal which comprises, a scribe member for establishing said record, a non-magnetic, cylindrical form member, mounting means for mechanically linking said form member to said scribe member, a first, magnetically permeable core member disposed interiorly of said cylindrical member and coaxially therewith, a magnetically permeable shell member disposed exteriorly of said non-magnetic form member and coaxially with said first core member, and magnetizing means connected in series magnetic circuit with said shell member and said core member for establishing a magnetic flux path having a gap extending radially between said core member and said shell member for linking said cylindrical form member, means mounting said cylindrical form member for movement along an axis common with said core member and said shell member, a winding disposed about said form member, and means for applying said electrical signal in circuit with said winding, whereby said scribe member is urged to move transversely to the direction of magnetic flux passing radially through said gap upon application of said signal to said winding.

2. Apparatus as set forth in claim 1 wherein said non-magnetic form member comprises a first, central portion, a second, concentrically disposed, exterior portion and a web portion for connecting said first and second form member portions and wherein said core member comprises longitudinal portions slotted for receiving said form member web portions.

3. Apparatus as set forth in claim 1 wherein said shell member comprises a slotted portion extending substantially along the extent thereof for passing said mounting means therethrough.

4. Apparatus as set forth in claim 1 wherein said scribe member comprises electric heating means and said record member is a thermally sensitive record member.

5. Apparatus as set forth in claim 4 and in combination therewith means for applying an electric current to said heating means.

6. Apparatus for establishing a record of an electrical signal on a record member which comprises, an electrical winding, a form for mounting said winding, said form being constructed of non-magnetic material and being mounted for linear motion along a mounting shaft for said form, means for establishing a magnetic field radially of said shaft, means for applying said signal to said winding, whereby said mounting form is urged to motion along said shaft in accordance with said signal, a scribe member mounted for movement with said form for establishing a record of said movement on said record member, wherein said radial field establishing means comprises, a cylindrical shell member of magnetically permeable material disposed exteriorly of said winding, said shell member having a slotted portion extending substantially parallel to said shaft for enabling mechanical communication between said form and said scribe member, a magnetically permeable core member extending along said shaft interiorly of said winding, and a permanent magnet for applying a magnetic potential between said core and said shell.

7. Apparatus as set forth in claim 6 and, in combination therewith, spring means for urging said shaft toward a central position on said shaft.

8. Apparatus for establishing a record of an electrical signal on a longitudinally movable record member which comprises a shaft member disposed transversely of the direction of longitudinal motion of said record member, an electrical winding, a coil form for said winding, said form being constructed of non-magnetic material and said form comprising, an exterior portion for receiving said winding, a central portion adapted for slidable motion along said shaft, and a web portion connecting said exterior portion and said central portion, a magnetically permeable, slotted core member extending exteriorly of said central form portion, slotted portions of said core member being disposed for receiving the web portion of said form, whereby said form is restrained from rotation about said shaft, a scribe member mounted on said form member for movement therewith, a ferromagnetic shell member disposed about said form member and having a slotted portion for connecting said scribe member therethrough to said form member, magnetizing means for establishing a radial magnetic flux from said core member to said shell member.

9. Apparatus as set forth in claim 8 wherein said magnetizing means comprises a first and a second magnet disposed oppositely of said shaft, for directing a magnetic flux through first and second core portions in opposed directions.

10. Apparatus as set forth in claim 9 wherein said magnetizing means comprises a magnetically permeable foundation plate magnetically connected in common with said shell member and with said first and second magnets in parallel magnetizing relation.

11. Apparatus as set forth in claim 10 and, in combination therewith, first and second spring members disposed about said shaft oppositely of said form member for urging said form member to a central position on said shaft.

References Cited by the Examiner
UNITED STATES PATENTS

| | | | |
|---|---|---|---|
| 1,820,088 | 8/31 | Parker et al. | 346—1 |
| 1,901,921 | 3/33 | Means | 346—1 |
| 2,109,109 | 2/38 | Finch | 178—11 |
| 2,522,240 | 9/50 | Sias | 346—32 |
| 2,617,947 | 11/52 | Wolf | 250—83.6 |
| 2,644,738 | 7/53 | Gardner | 346—76 |

References Cited by the Applicant
UNITED STATES PATENTS 2,581,133   1/52   Niemann.

LEYLAND M. MARTIN, *Primary Examiner*.